(12) United States Patent
Lin et al.

(10) Patent No.: US 7,686,508 B2
(45) Date of Patent: Mar. 30, 2010

(54) CMOS TEMPERATURE-TO-DIGITAL CONVERTER WITH DIGITAL CORRECTION

(75) Inventors: Xijian Lin, Fremont, CA (US); Phillip J. Benzel, Pleasanton, CA (US)

(73) Assignee: Intersil Americas Inc., Milpitas, CA (US)

( * ) Notice: Subject to any disclaimer, the term of this patent is extended or adjusted under 35 U.S.C. 154(b) by 207 days.

(21) Appl. No.: 11/584,421

(22) Filed: Oct. 21, 2006

(65) Prior Publication Data

US 2008/0095213 A1   Apr. 24, 2008

(51) Int. Cl.
*G01K 7/01* (2006.01)
*H01L 35/00* (2006.01)

(52) U.S. Cl. .................. 374/178; 374/170; 327/512; 702/130

(58) Field of Classification Search ......... 374/170–173, 374/175, 178; 702/130–136; 327/512–513
See application file for complete search history.

(56) References Cited

U.S. PATENT DOCUMENTS

| | | | | |
|---|---|---|---|---|
| 4,952,866 A * | 8/1990 | Van Tuijl | ................... | 323/315 |
| 5,519,354 A * | 5/1996 | Audy | ................... | 327/512 |
| 5,619,122 A * | 4/1997 | Kearney et al. | ................... | 323/312 |
| 5,796,280 A * | 8/1998 | Tuozzolo | ................... | 327/205 |
| 5,982,221 A * | 11/1999 | Tuthill | ................... | 327/512 |
| 6,008,685 A * | 12/1999 | Kunst | ................... | 327/512 |
| 6,019,508 A * | 2/2000 | Lien | ................... | 374/178 |
| 6,037,832 A * | 3/2000 | Kaminishi | ................... | 327/538 |
| 6,157,244 A * | 12/2000 | Lee et al. | ................... | 327/539 |
| 6,554,469 B1* | 4/2003 | Thomson et al. | ................... | 374/178 |
| 6,736,540 B1* | 5/2004 | Sheehan et al. | ................... | 374/183 |
| 6,890,097 B2* | 5/2005 | Tanaka | ................... | 374/185 |
| 6,957,910 B1* | 10/2005 | Wan et al. | ................... | 374/183 |
| 7,083,328 B2* | 8/2006 | Johnson | ................... | 374/178 |
| 7,170,334 B2* | 1/2007 | Miranda et al. | ................... | 327/512 |
| 7,193,543 B1* | 3/2007 | McLeod et al. | ................... | 341/123 |
| 7,236,048 B1* | 6/2007 | Holloway et al. | ................... | 327/539 |
| 7,281,846 B2* | 10/2007 | McLeod | ................... | 374/178 |
| 7,309,157 B1* | 12/2007 | Aslan et al. | ................... | 374/178 |
| 7,312,648 B2* | 12/2007 | Yang | ................... | 327/512 |
| 7,321,225 B2* | 1/2008 | Garlapati et al. | ................... | 323/313 |
| 7,341,374 B2* | 3/2008 | Chiu | ................... | 374/1 |

(Continued)

OTHER PUBLICATIONS

K. Kujik, "A Precision Reference Voltage Source," IEEE J. Solid State Circuits, vol. SC-8, Jun. 1973, pp. 222-226.

(Continued)

*Primary Examiner*—Gail Verbitsky
(74) *Attorney, Agent, or Firm*—Fliesler Meyer LLP

(57) ABSTRACT

Methods and systems for producing a digital temperature reading are provided. In an embodiment, one or more current sources and one or more switches are used to selectively provide a first amount of current (I1) and a second amount of current (I2) to the emitter of a transistor (Q1), during different time slots of a time period, to thereby produce a first base-emitter voltage (Vbe1) and a second base-emitter voltage (Vbe2), where I1=I2*M, and M is a known constant. An analog-to-digital converter (ADC) digitizes analog signals representative of the magnitudes Vbe1 and Vbe2. A difference is determined between the magnitudes of Vbe1 and Vbe2. A digital calculator produces a digital temperature reading (DTR) based on the difference between the magnitudes of Vbe1 and Vbe2.

23 Claims, 4 Drawing Sheets

U.S. PATENT DOCUMENTS 7,368,973 B2 * 5/2008 Sato .......................... 327/512

OTHER PUBLICATIONS

B. Song, et al., "A Precision Curvature-compensated CMOS Bandgap Reference," IEEE J. Solid State Circuits, vol. SC-18, Dec. 1983, pp. 634-643.

M. Tuthill, "A Switched-current, Switched-capacitor Temperature Sensor in 0.6 um CMOS," IEEE J. Solid State Circuits, vol. SC-33, Jul. 1998, pp. 1117-1122.

M. Pertijs, et al., "A cmos Smart Temperature Sensor with a 3 Sigma Inaccuracy of +/−0.5 deg C from −50 to 120 deg C," IEEE J. Solid State Circuits, vol. SC-40, Feb. 2005, pp. 454-461.

M. Pertijs, et al., "A cmos Smart Temperature Sensor with a 3 sigma Inaccuracy of +/−0.1 deg C from −55 to 125 deg C," IEEE J. Solid State Circuits, vol. SC-40, Dec. 2005, pp. 2805-2815.

J. Huijsing, et al., "Analog Circuit Design", Boston/Dordrecht/London: Kluwer Academic, 1996,pp. 350-351.

M. Pertijs, et al. "A High-Accuracy Temperature Sensor with Second-order Curvature Correction and Digital Bus Interface", in Proc. ISCAS, May 2001, pp. 368-371.

* cited by examiner

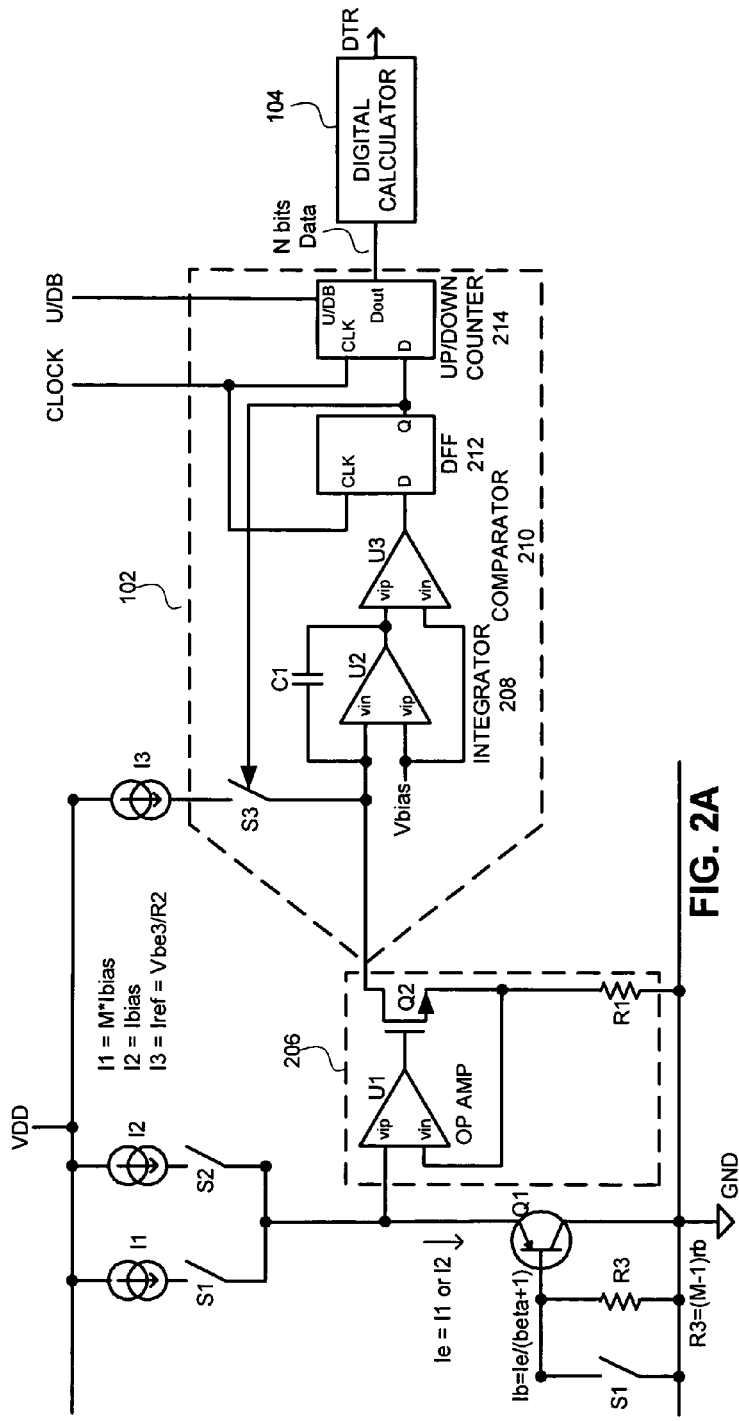
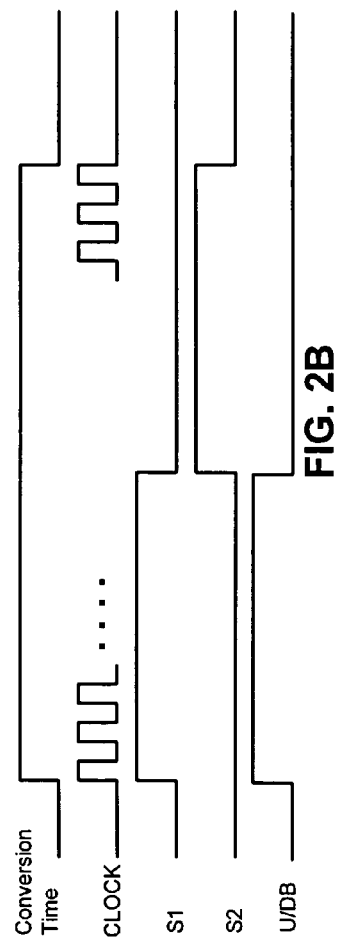
FIG. 2A
FIG. 2B

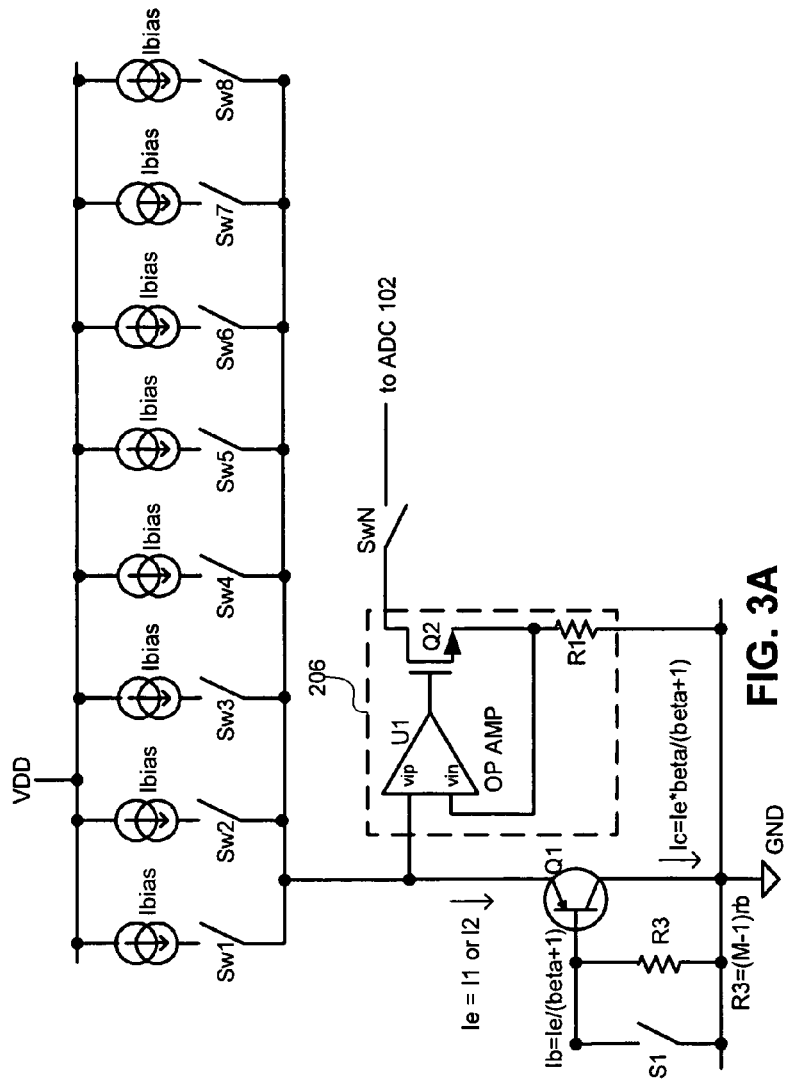
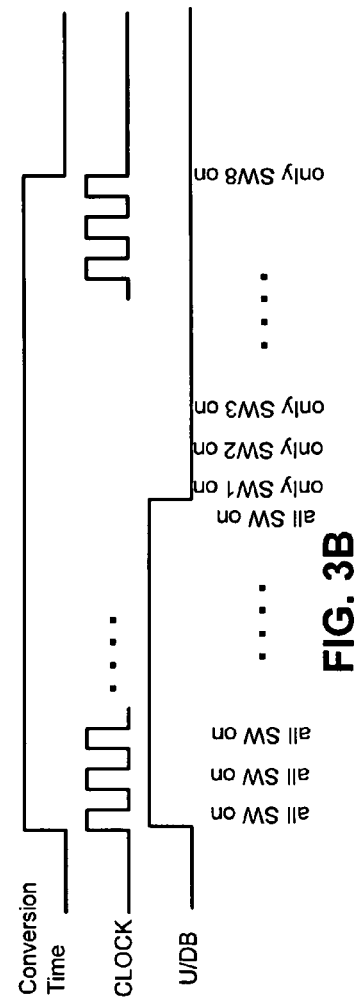
FIG. 3A
FIG. 3B

CMOS TEMPERATURE-TO-DIGITAL CONVERTER WITH DIGITAL CORRECTION

FIELD OF THE INVENTION

The present invention relates to temperature sensors, and more specifically to methods and systems that provide a digital output that is indicative of temperature.

BACKGROUND

There has been a growing demand in thermal management systems for integrated temperature sensors with on-chip PN junction diodes/transistors, analog-to-digital converters (ADCs) and bus interfaces. For example, these so-called "smart" temperature sensors are widely used in PCs, laptops and LCD displays to monitor the system temperature. Such applications typically require low-cost temperature sensors with a desired accuracy within +/−1.0 degree Celsius (deg C.). In other words, it is desired that the inaccuracy be below +/−1.0 deg C.

In order to convert temperature to a digital value, both a well-defined temperature-dependent signal and a temperature-independent reference signal are required. The temperature-dependent signal can be obtained by comparing the difference in the base-emitter voltages of two bipolar (BJT) transistors at different current densities. The temperature-independent reference signal can be obtained by using a bandgap reference voltage, which also depends on the base-emitter voltages. The base-emitter voltage Vbe of a single transistor in its forward-active region has a typical slope of about −2 mV/deg K and an extrapolated value at 0 deg K of roughly 1.2 V. The delta Vbe between the base-emitter voltages of two such transistors biased at different collector currents is proportional to absolute temperature (ptat) and has a value and a temperature coefficient which are typically one order of magnitude smaller than those of Vbe. Equations 1 and 2 below define such relationships.

$$Vbe=(kT/q)\ln(Ic/Is) \quad \text{(Eq. 1)}$$

$$\text{delta } Vbe=Vbe1-Vbe2=(kT/q)\ln[(Ic1*Is2)/(Ic2*Is1)]=(kT/q)\ln(M) \quad \text{(Eq. 2)}$$

Where,
Is the saturation current,
Ic is the collector current,
k is Boltzmann's constant,
q is the electron charge,
T is the temperature in degree Kelvin, and
M=(Ic1*Is2)/(Ic2*Is1).

Because of the small value and the small temperature coefficient of the delta Vbe, special care has to be taken to avoid the occurrence of errors due to mismatch of bipolar transistors and op-amp offset. For example, where M=8, a mere 0.53 mV of mismatch in Vbe (or offset voltage of the op-amp used to sense the delta Vbe; the offset voltage directly added to the delta Vbe) produces a 1% error in the absolute temperature, which is translates to a 3 deg C. error at ambient temperature. Where M=3, this mismatch or offset should be smaller than 10 uV to obtain a negligible temperature error (0.1 deg C.). Previous designs have employed nested-chopping/auto zeroing to reduce temperature errors due to the effects of mismatch in Vbe and offset voltage of amplifiers used in the readout circuit.

Various temperature sensors, some of which are temperature to digital converts, are known in the prior art, including those listed below, each of which are incorporated herein by reference: K. Kujik, "A precision reference voltage source," IEEE J. Solid State Circuits, vol. SC-8, pp. 222-226, June 1973; B. Song and P. Gray, "A precision curvature-compensated CMOS bandgap reference," IEEE J. Solid State Circuits, vol. SC-18, pp. 634-643, December 1983; M. Tuthill, "A switched-current, switched-capacitor temperature sensor in 0.6 um CMOS," IEEE J. Solid State Circuits, vol. SC-33, pp. 1117-1122, July, 1998; M. Pertijs, A Niederkorn, B. Mckillop, A. Baker, J. Huijsing, "A CMOS smart temperature sensor with a 3 sigma inaccuracy of +/−0.5 deg C. from −50 to 120 deg C.," IEEE J. Solid State Circuits, vol. SC-40, pp. 454-461, February 2005; M. Pertijs, K. Makinwa, J. Huij sing, "A CMOS smart temperature sensor with a 3 sigma inaccuracy of +/−0.1 deg C. from −55 to 125 deg C.," IEEE J. Solid State Circuits, vol. SC-40, pp. 2805-2815, December, 2005; J. Huijsing, R. J. van de Plassche and W. Sansen, "Analog Circuit Design", Boston/Dordrecht/London: Kluwer Academic, 1996, pp. 350-351; and M. Pertijs, A. Bakker, J. Huijsing, "A High-Accuracy Temperature Sensor with Second-order Curvature Correction and Digital Bus interface", in Proc. ISCAS, May 2001, pp. 368-371.

Nevertheless, each of the above mentioned temperature sensor have certain aspects that need improving. In other words, there is still a desire to improve upon previous temperature sensors, including previous temperature to digital converters.

SUMMARY OF THE INVENTION

Embodiments of the present invention are directed to methods and systems for producing a temperature reading, which can be a digital output indicative of temperature. In accordance with an embodiment of the present invention, a transistor (Q1) is configured to have its base connected to its collector and its collector connected to ground. A first amount of current (I1) and a second amount of current (I2) are provided to the emitter of the transistor (Q1), during different time slots of a time period, to thereby produce a first base-emitter voltage (Vbe1) and a second base-emitter voltage (Vbe2), where I1=I2*M, and M is a known constant. Analog signals indicative of magnitudes of Vbe1 and Vbe2 are digitized, and a difference between the magnitudes of Vbe1 and Vbe2 is determined digitally. A digital temperature reading (DTR) is determined based on the digitally determined difference between the magnitudes of Vbe1 and Vbe2.

In accordance with an embodiment, the DTR is produced using the following equation:

$$DTR=K*Data/[K*Data/(2^N)+1],$$

where K is a constant, Data is an N-bit digital value indicative of the difference between the magnitude of Vbe1 and the magnitude of Vbe2, and N is the number of bits of the Data, which is an integer $\geq 2$.

In accordance with an embodiment, I1 is produced during a first contiguous time slot, and I2 is produced during a second contiguous time slot the follows the first time slot. In an alternative embodiment, I1 is produced during one or more time slots that need not be contiguous, and I2 is produced during one or more further time slots that need not be contiguous.

In accordance with an embodiment of the present invention, I1 is produced by simultaneously and continually turning on M current sources during a first time slot, and I2 is produced by separately turning on each of the M current sources during different portions of a second time slot that equals the first time slot. In such embodiment, each of the different portions of the second time slot can be equal to $1/M^{th}$ of the first time slot. In an alternative embodiment, I1 is produced by continually turning on a current source during a first time slot, and I2 is produced by turning on the same current source for only 1/M$^{th}$ of a second time slot that equals the first time slot.

In accordance with an embodiment of the present invention, one or more current sources and one or more switches are used to selectively provide the first amount of current (I1) and the second amount of current (I2) to the emitter of the transistor (Q1), during different time slots of a time period, to thereby produce the first base-emitter voltage (Vbe1) and the second base-emitter voltage (Vbe2). In accordance with an embodiment, the one or more switches are turned on and off at times that corresponds to transitions of a clock signal. Further, a voltage-to-current converter is used to convert Vbe1 and Vbe2 to currents. Additionally, the turning off a further switch, at the output of the voltage-to-current converter, for short time periods centered about transitions of the clock signal, is used reduce the effects of charge-injection due to the turning on and off of the one or more switches used to provide I1 and I2 to the emitter of the transistor (Q1).

In accordance with an embodiment of the present invention, an analog-to-digital converter (ADC) is used to digitize the analog signals representative of the magnitudes Vbe1 and Vbe2. In accordance with an embodiment, a digital up/down counter is used to determine a different between the magnitudes of Vbe1 and Vbe2. The up/down counter can be considered part of the ADC, but need not be. In accordance with an embodiment, a digital calculator is used to calculate the digital temperature readings (DTRs) based on the outputs of the ADC.

In accordance with an embodiment, Vbe1 and Vbe2 are converted to currents using a voltage-to-current converter that includes a first resistor (R1), to thereby produce the analog signals indicative of the magnitudes of Vbe1 and Vbe2. Additionally, a further transistor (Q3) is used to produce a third base-emitter voltage (Vbe3), where the base and collector of the third transistor are connected together, the collector is connected to ground, and a current proportional to absolute temperature (Iptat) is provided to the emitter of the further transistor (Q3). In such embodiment, Vbe3 is converted to a reference current (Iref) using a further voltage-to-current converter that includes a second resistor (R2), where Iref=Vbe3/R2. Additionally, Iref is used as a reference when digitizing the analog signals indicative of the magnitudes of Vbe1 and Vbe2. In this embodiment, the DTR can be produced using the following equation:

$DTR=K*(R2/R1)*(kT/q)\ln(M)/[K*(R2/R1)*(kT/q)\ln(M)+Vbe3]*(2^N)$, where K is a constant, k is Botzmann's constant, T is the temperature in degrees Kelvin, q is the electron charge, and N is an integer $\geq 2$.

In an alternative embodiment of the present invention, a current proportion to absolute temperature (Iptat) is provided to the emitter of the same transistor (Q1) to thereby produce a third base-emitter voltage (Vbe3). In such embodiment, the DTR can be produced using the following equation:

$DTR=K*(kT/q)\ln(M)/[K*(kT/q)\ln(M)+Vbe3]*(2^N)$, where K is a constant, k is Botzmann's constant, T is the temperature in degrees Kelvin, q is the electron charge, and N is an integer $\geq 2$.

This summary is not intended to be a complete description of the embodiments of the present invention. Further and alternative embodiments, and the features, aspects, and advantages of the present invention will become more apparent from the detailed description set forth below, the drawings and the claims.

BRIEF DESCRIPTION OF THE DRAWINGS

FIG. 2A shows a circuit implementation of the concept shown in FIG. 1A, according to an embodiment of the present invention.

FIG. 2B shows an exemplary timing diagram that can be used with the circuit of FIG. 2B.

FIG. 3 shows how currents I1 and I2 in FIGS. 1A and 2A can be generated, in accordance with an embodiment of the present invention.

DETAILED DESCRIPTION

Embodiments of the present invention relate to high accuracy and low cost temperature sensor circuits. In accordance with embodiments of the present invention, a sensor circuit employs an ADC to digitize different voltages of Vbe in different time slots, and then uses a digital correction scheme to obtain an accurate delta Vbe in the digital domain and thereafter a digital temperature reading (DTR).

Figure 1A:
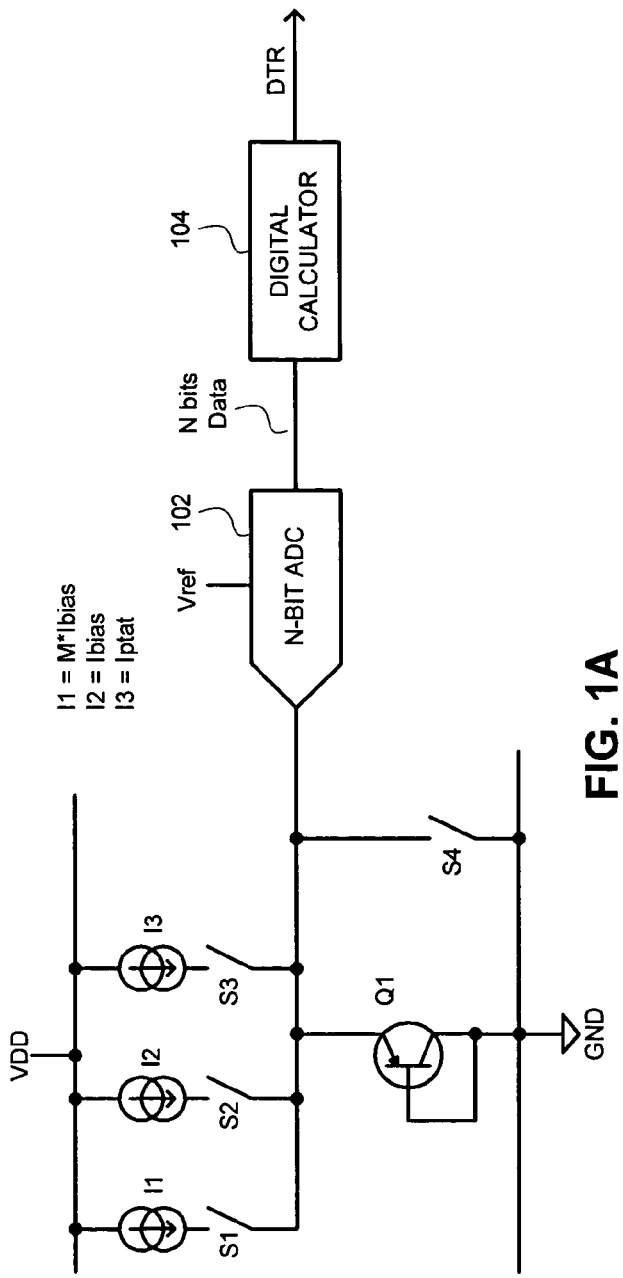
FIG. 1A shows a temperature-to-digital converter circuit concept according to an embodiment of the present invention.
Figure 1B:
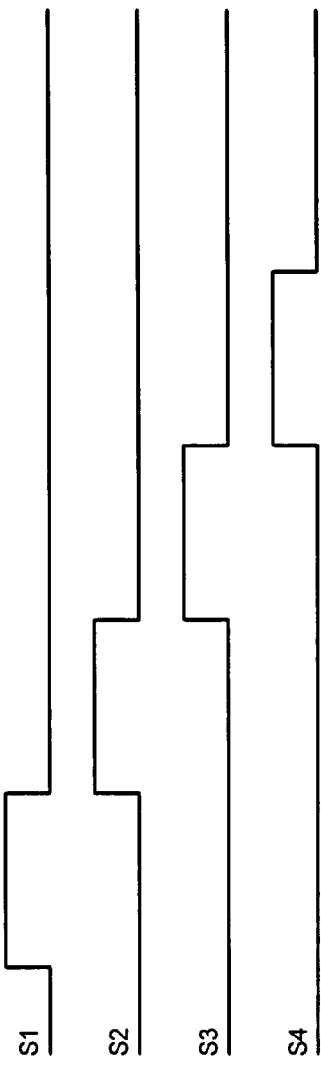
FIG. 1B shows an exemplary timing diagram that can be used with the circuit of FIG. 1A.

FIG. 1A shows a temperature circuit concept according to an embodiment of the present invention. Referring to FIG. 1A, the circuit is shown as using three currents I1, I2 and I3, a bipolar transistor. Q1, an analog-to-digital converter (ADC) 102 and a digital-calculator 104. Switches S1, S2, S3 and S4 are used to provide the three different currents I1, I2 and I3 or no current (when S4 is connected to ground) to the input of the ADC 102, in a time multiplexed manner, as can be appreciated from the timing diagram of FIG. 1B. As shown in FIG. 1A, I1=M*Ibias, I2=Ibias and I3=Iptat, where Ibias is a bias current, Iptat is a proportional-to-temperature current, and M is a constant. Also shown in FIG. 1A is that the ADC 102 receives a reference voltage (Vref), which is an arbitrary voltage. As can be appreciated from the following equations, Vref can vary with temperature and have a poor accuracy, since it is canceled out.

The ADC 102 generates three digital values for 3 Vbe voltages corresponding to the three different currents I1, I2 and I3 in different time slots, and an additional digital value for a 0V voltage:

$D1=(2^N)*(Vbe1+Vos)/Vref$ (Eq. 3)

$D2=(2^N)*(Vbe2+Vos)/Vref$ (Eq. 4)

$D3=(2^N)*(Vbe3+Vos)/Vref$ (Eq. 5)

$D4=(2^N)*Vos/Vref$ (Eq. 6)

Here, Vos is the input offset voltage of the ADC 102, and N is the number of bits of resolution of the ADC 102, which is an integer $\geq 2$. The digital-calculator 104 uses these outputs to calculate the digital temperature reading (DTR) using the following equation:

$$DTR = K*(D1-D2)/[K*(D1-D2)+(D3-D4)]* \quad \text{(Eq. 7)}$$
$$(2^\wedge N)$$
$$= K*(kT/q)\ln(M)/[K*(kT/q)\ln(M)+Vbe3]*$$
$$(2^\wedge N)$$

Here, K is a constant provided by digital logic of the digital calculator 104, and gives a bandgap reference value equal to K*(kT/q)ln(M)+Vbe3 that is be zero-temperature dependent at a reference temperature. Therefore, DTR is linearly changed with temperature and can be used as a temperature reading for the $1^{st}$ order approximation. When Vbe3 is biased with Iptat, K can be further increased slightly to compensate the bandgap reference voltage's curvature and to achieve the temperature sensor's accuracy better than +/−0.3 deg C.

In order to calibrate the process variation of Vbe3, the Iptat current can be used for trimming. Further, the effects of Vos and Vref variations are completely removed with the digital correction according to the above equation for DTR. In addition, the effect of the bipolar transistor's variation on delta Vbe is also removed because the same device (i.e., Q1) is used to provide Vbe1 and Vbe2.

FIG. 2A shows a practical implementation of the circuit concept shown in FIG. 1A, using CMOS process, in accordance with an embodiment of the present invention. In FIG. 2, voltage signals, including Vbe, are converted into current signals using a voltage-to-current (V2C) converter 206. In the embodiment shown, the V2C 206 is shown as including an operational amplifier U1, an NMOS transistor Q2 and a resistor R1. However, other configurations are also possible, which are within the scope of the present invention.

In FIG. 2A, the two currents I1 and I2 are used to produce Vbe1 and Vbe2, which are converted to currents that are provided to the ADC 102, and the third current I3 (also referred to as Iref) proportional to a Vbe3 is used as the reference current Iref for the ADC 102. As can be appreciated from the discussion below, this arrangement reduces the conversion times for the ADC 102 from 4 time slots to 2 time slots for each temperature reading, and reduces analog and digital hardware. Exemplary circuits for generating currents I1, I2 are discussed below with reference FIG. 3, and an exemplary circuit for generating Iref is discussed below with reference to FIG. 4.

Further, in FIG. 2A, the ADC 102 is implemented as a charge-balancing ADC. In accordance with a specific embodiment, the ADC 102 includes an integrator 208, a comparator 210, a D-flip-flop 212, and an up/down counter 214, as shown in FIG. 2A. The integrator 208 is shown as including an op-amp U2 and a capacitor C1. The op-amp U2 has an inverting input (vin), a non-inverting input (vip) and an output. The capacitor C1 is connected between the output and the inverting (vin) input of the op-amp U2. The non-inverting input (vip) receives a bias voltage (vbias). The comparator 210 includes an op-amp U3 having an inverting input (vin), a non-inverting input (vip) and an output. The non-inverting input (vip) of the op-amp U3 receives the output of the integrator 208; the inverting input (vin) of the op-amp U3 receives the bias voltage (vbias); and the output of the op-amp U3, which is the output of the comparator 210, is provided to the D input of the D-flip-flop 212. The CLK input of the D-flip-flop 212 receives a clock signal (CLOCK). The Q output of the D-flip-flop 212 is used to turn on and off the switch S3, as well as being provided to the D input of the up/down counter 214. The CLK input of the up/down counter 214 also receives the clock signal (CLOCK). An up/down bit (U/DB) input of the up/down counter 214 receives an up/down bit signal. In accordance with an embodiment, as shown in FIG. 2B, the up/down bit signal should be high when the switch S1 is turned on (i.e., closed) and the switch S2 is turned off (i.e., open), which will cause the up/down counter 214 to count up; and the up/down bit signal should be low when the when the switch S1 is turned off (i.e., open) and the switch S2 is turned on (i.e., closed), which will cause the up/down counter 214 to count down. In this arrangement, the output of the up/down counter 214 is indicative of the difference between Vbe1 and Vbe2. This output of the up/down counter 214, which is the output of the ADC 102, is provided to the digital calculator 104.

It is also possible that the up/down counter 214 be external to the ADC 102. In other words, the up/down counter 214, or a block that performs its function, can be between the ADC 102 and the digital calculator 104. It is also possible that the up/down counter 214, or at least its function, be implemented within the digital calculator 104.

The ADC 102 shown in FIG. 2A, which is a charge-balancing ADC, acts as a first order delta-sigma modulator type quantizer. Other types of ADCs, or more generally, other types of quantizers, can be used, while still being within the scope of the present invention.

In accordance with an embodiment, the digital calculator 104 can be implemented, e.g., using simple CMOS logic, or simple register transfer level (RTL) circuit. It is also possible that the digital calculator 104 be implemented using software coding with a digital signal processor (DSP) or a microprocessor, if available. These are just a few examples of how the digital calculator 104 can be implemented. Other implementations are also within the scope of the present invention.

Still referring to FIG. 2A, when the output of the D-flip-flop 212 is high (causing the up/down counter 214 to count up or down), the switch S3 within the ADC 102 will be closed and Iref will be added to the input of the integrator 208. This is used to achieve the so-called charge-balancing of the ADC. During the period of conversion, current provided to the input of the ADC 102 (also referred to as the input current to the ADC, or simply as the input current) is integrated all the time; at the same time, Iref is added to the input of the integrator 208 for certain clock periods to bring the integrator's output voltage back. The net result is that the charge integrated from the input current in the whole conversion period is equal to the charge integrated from Iref for certain clock periods. The up/down counter 214 is used to record how many clock periods are used, and to produce the digital output. In accordance with a specific embodiment, the whole conversion period is divided into 2 time slots, with each time slot including $2^\wedge N$ clock periods, where N is number of ADC bits. Other variations are also possible, and within the scope of the present invention.

In accordance with an embodiment, the device Q1 is a vertical PNP bipolar transistor made from a parasitic structure of P+ to NWELL to P-SUB in a CMOS process. The device Q1 can also be a NPN or PNP transistor, or a simple diode when a BJT or BiCMOS process is used. The resistor R3 is used to compensate for the effect of the base resistance (rb).

The overall operation of the circuit of FIG. 2A will now be described with reference to FIG. 2A and the timing diagram of FIG. 2B. As can be seen from FIG. 2B, a temperature-to-digital conversion time is divided into two equal time slots. Each time slot contains $2^\wedge N$ clocks for N-bit resolution. In the $1^{st}$ time slot, the switches S1 are on (i.e., closed) and the switch S2 is off (i.e., open), resulting in the bias current I1=M*Ibias generating Vbe1 for the bipolar device Q1. This voltage (Vbe1) is converted into a current by the V2C converter 206, and is digitized by the ADC 102 with the up/down bit (U/DB) being high for counting up. Equations for Vbe1, I1 and D1 are shown below.

$$Vbe1 = (kT/q)\ln[M*Ibias*beta/(beta+1)/Is] \quad \text{(Eq. 8)}$$

$$I1 = [Vbe1 + rb*(M*Ibias)/(beta+1) + Vos]/R1 \quad \text{(Eq. 9)}$$

$$D1 = I1/Iref*2\wedge N = I1/(Vbe3/R2)*(2\wedge N) \quad \text{(Eq. 10)}$$

Here, beta is the common-emitter current gain, and Vos is the offset voltage of the op-amp U1. D1 is the number of times to count up in the $1^{st}$ time slot, which is indicative of Vbe1.

Still referring to FIGS. 2A and 2B, in the $2^{nd}$ time slot, the switches S1 are off (i.e., open) and the switch S2 is on (i.e., closed). This results in the bias current I2=Ibias generating Vbe2 for the same device Q1. This voltage is converted into a current by the V2C 206, and is digitized by the ADC 102 with U/DB being low for counting down. Equations for Vbe2, I2 and D2 are shown below.

$$Vbe2 = (kT/q)\ln[Ibias*beta/(beta+1)/Is] \quad \text{(Eq. 11)}$$

$$I2 = [Vbe2 + (rb + (M-1)*rb)*Ibias/(beta+1) + Vos]/R \quad \text{(Eq. 12)}$$

$$D2 = I2/Iref*2\wedge N = I2/(Vbe3/R2)*(2\wedge N) \quad \text{(Eq. 13)}$$

Here, D2 is the number of times to count down in the $2^{nd}$ time slot, which is indicative of Vbe2.

At the end of the conversion time (i.e., after the $2^{nd}$ time slot in FIG. 2B), the digital output from the ADC 206 is:

$$\text{Data} = D1 - D2 = [(kT/q)\ln(M)]*(R2/R1)/Vbe3*(2\wedge N) \quad \text{(Eq. 14)}$$

In Equation 14, the Data, since it is equal to the difference between D1 and D2, is indicative of the delta Vbe (i.e., indicative of Vbe1−Vbe2). Here, resistors R1 and R2 can be same type of resistors, and therefore (R2/R1) can be a constant ratio not dependent on temperature. As can be appreciated from Equation 14, the errors due to Is, beta and rb of device Q1 in delta Vbe (represented by the Data), and Vos of the op-amp U1, are removed.

In order to obtain a digital reading which is linearly changed with temperature, the digital-calculator block 104 uses the Data output of the ADC 102 to calculate the digital temperature reading (DTR) using the following equation:

$$DTR = K*\text{Data}/[K*\text{Data}/(2\wedge N) + 1] \quad \text{(Eq. 15)}$$
$$= K*(R2/R1)*(kT/q)\ln(M)/[K*(R2/R1)*$$
$$(kT/q)\ln(M) + Vbe3]*(2\wedge N)$$

Here, K is a constant provided by digital logic of the digital calculator 104, and provides a bandgap reference value equal to K*(R2/R1)*(kT/q)ln(M)+Vbe3 that is zero-temperature dependent at a reference temperature, as K is in the Equation 7 above. K can be further increased slightly for curvature correction. Further, to calibrate for process variation of Vbe3, the Iptat current can be used for trimming. The resulting DTR is a digital reading linearly varied with temperature according to the Equation 15. The implementation of the digital-calculator block should be simple since Equation 15 only involves multiplication with a constant, addition with a constant, and division.

FIG. 3A shows how currents I1 and I2 of FIG. 2A can be generated using a technique which can be referred to as a dynamic element matching. Typically, currents for use in a temperature-to-digital converter circuit are generated simultaneously. In contrast, in the embodiment of FIG. 3A, the currents I1 and I2 are generated in different time slots, enabling both currents to be provided to the emitter of the same device (Q1) during different times. For illustration, here the ratio I1/I2=8. For any desired ratio of M/1, M current sources can be used, as will be appreciated from this discussion. In accordance with an embodiment, during the $1^{st}$ time slot, all current sources are on; and during the $2^{nd}$ time slot, only one current source is alternatively on. For an example, during the $1^{st}$ time slot, all the switches SW1 ... SW8 are on for 8 clock periods; and during the $2^{nd}$ time slot, only SW1 is on for the $1^{st}$ clock period, and then only SW2 is on for the $2^{nd}$ clock period, etc., until only SW8 is on for the $8^{th}$ clock period. This can be appreciated from the timing diagram of FIG. 3B.

It is also possible that a single current source with a single switch be used to produce currents I1 and I2. For example, where I1/I2=M=8, this can be accomplished by closing the switch for an entire $1^{st}$ time period that is 8 clock periods in length (to generate I1), and then closing the switch for only 1 clock period of a $2^{nd}$ time period that is also 8 clock periods in length (to generate I2).

As can be appreciated from the above description, I1 and I2 are amounts of currents that are produced during different time slots of a time period. In the above described embodiments, I1 is produced during a $1^{st}$ contiguous time slot, and I2 is produced during a $2^{nd}$ contiguous time slot that follows the $1^{st}$ time slot. But this need not be the case. For example, I2 can be produced before I1. It is also possible that I1 and I2 are produced during time slots that are not contiguous, so long as the up/down counter (214 in FIG. 2A) is counting in one direction when I1 (or a portion thereof) is being produced, and in the opposite direction when I2 (or a portion thereof) is being produced, and so long as the ratio of I1/I2 is a known constant (M). For example, referring to FIGS. 3A and 2A, all the switches in FIG. 3A can be closed during a $1^{st}$ clock period while the up/down counter (214 in FIG. 2A) is counting up (as instructed by the U/DB); then only switch Sw1 can be closed during a $2^{nd}$ clock period while the up/down counter is counting down; then all the switches Sw1 ... Sw8 in FIG. 3A can be closed during a $3^{rd}$ clock period while the up/down counter is counting up; then only switch Sw2 can be closed during a $4^{th}$ clock period while the up/down counter is counting down; ... until at the $16^{th}$ clock period only switch Sw8 is closed while the up/down counter is counting down. One of ordinary skill in the art, reading the above description, will also appreciate that other variations are also possible, which are within the scope of the present invention.

In order to reduce the effect of charge-injection due to the turning on and off of the switches Sw1, Sw2 ..., an additional switch SwN can be added, as shown in FIG. 3A. In accordance with specific embodiments of the present invention, the switch SwN is turned off for a short time period with its center corresponding to the clock's transition edges.

Figure 4:
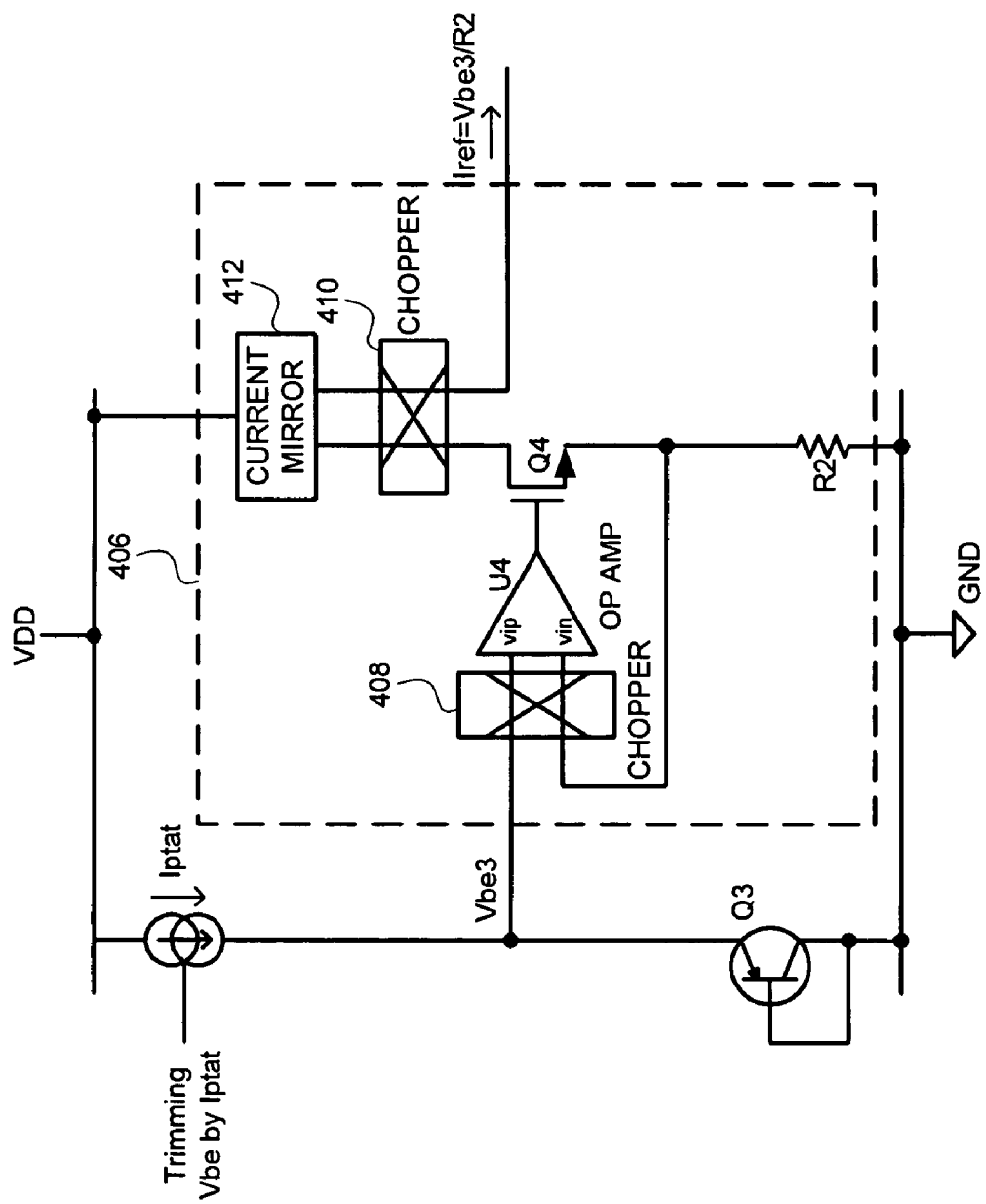
FIG. 4 shows a circuit that can be used to produce the reference current, I3, of FIG. 2A, according to an embodiment of the present invention.

FIG. 4 shows a simple implantation for a further voltage-to-current converter 406, which can be used to produce the reference current Iref (i.e., I3 in FIG. 2A), using a further transistor (Q3) and a proportional to absolute temperature current (Iptat). Here, the resistor R2 is preferably the same type resistor as the resistor R1 in FIG. 2A. As shown, a simple chopping technique, using choppers 408 and 410, is used to reduce the effects of Vos of the op-amp U4 and the mismatch of the current mirror 412, because the Vbe is preferably a magnitude (e.g., 10×) larger than the delta Vbe. The Iptat current source is trimmed for the process variation of Vbe3.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Unless otherwise specified, alternate boundaries can be defined so long as the specified functions and relationships thereof are appropriately performed. Any such alternate boundaries are thus within the scope and spirit of the claimed invention.

What is claimed is:

1. A method for producing a temperature reading using a transistor (Q1) including a base, an emitter and a collector, where the base is connected to the collector, and a current path is between the emitter and the collector, the method comprising:
   (a) providing a first amount of current (I1) and a second amount of current (I2) to the current path of the transistor (Q1), during different time slots of a time period, to thereby produce a first base-emitter voltage (Vbe1) and a second base-emitter voltage (Vbe2), where I1=I2*M, and M is a known constant;
   (b) digitizing analog signals indicative of magnitudes of Vbe1 and Vbe2;
   (c) digitally determining a difference between the magnitudes of Vbe1 and Vbe2; and
   (d) producing a digital temperature reading (DTR) based on the difference between the magnitudes of Vbe1 and Vbe2, wherein step (e) comprises producing the DTR using the following equation:

$DTR = K*Data/[K*Data/(2^N)+1]$ where K is a constant, Data is an N-bit digital value indicative of the difference between the magnitude of Vbe1 and the magnitude of Vbe2, and N is the number of bits of the Data, which is an integer $\geq 2$.

2. The method of claim 1, wherein I1 is produced during a first contiguous time slot, and I2 is produced during a second contiguous time slot the follows the first time slot.

3. The method of claim 1, wherein I1 is produced during one or more time slots that need not be contiguous, and I2 is produced during one or more further time slots that need not be contiguous.

4. A method for producing a temperature reading using a transistor (Q1) including a base, an emitter and a collector, where the base is connected to the collector, and a current path is between the emitter and the collector, the method comprising:
   (a) providing a first amount of current (I1) and a second amount of current (I2) to the current path of the transistor (Q1), during different time slots of a time period, to thereby produce a first base-emitter voltage (Vbe1) and a second base-emitter voltage (Vbe1), wherein I1 is produced by simultaneously and continually turning on M current sources during a first time slot, and I2 is produced by separately turning on each of the M current sources during different portions of a second time slot that equals the first time slot so that I1=I2*M, and M is a known constant that is greater than or equal to 2;
   (b) digitizing analog signals indicative of magnitudes of Vbe1 and Vbe2;
   (c) digitally determining a difference between the magnitudes of Vbe1 and Vbe2; and
   (d) producing a digital temperature reading (DTR) based on the difference between the magnitudes of Vbe1 and Vbe2.

5. The method of claim 4, wherein each of the different portions of the second time slot is equal to $1/M^{th}$ of the first time slot.

6. A method for producing a temperature reading using a transistor (Q1) including a base, an emitter and a collector, where the base is connected to the collector, and a current path is between the emitter and the collector, the method comprising:
   (a) providing a first amount of current (I1) and a second amount of current (I2) to the current path of the transistor (Q1), during different time slots of a time period, to thereby produce a first base-emitter voltage (Vbe1) and a second base-emitter voltage (Vbe2), wherein I1 is produced by continually turning on a current source during a first time slot, and I2 is produced by turning on the same current source for only $1M^{th}$ of a second time slot that equals the first time slot, so that I1=I2*M, and M is a known constant M;
   (b) digitizing analog signals indicative of magnitudes of Vbe1 and Vbe2;
   (c) digitally determining a difference between the magnitudes of Vbe1 and Vbe2; and
   (d) producing a digital temperature reading (DTR) based on the difference between the magnitudes of Vbe1 and Vbe2.

7. The method of claim 6, wherein step (c) includes using a digital up/down counter to determine a difference between the magnitudes of Vbe1 and Vbe2.

8. A method for producing a temperature reading using a transistor (Q1) including a base, an emitter and a collector, where the base is connected to the collector, and a current path is between the emitter and the collector, and a further transistor (Q3) including a base, an emitter and a collector, where the base is connected to the collector, and a current path is between the emitter and the collector,
the method comprising:
   (a) providing a first amount of current (I1) and a second amount of current (I2) to the current path of the transistor (Q1), during different time slots of a time period, to thereby produce a first base-emitter voltage (Vbe1) and a second base-emitter voltage (Vbe2), where I1=I2*M, and M is a known constant;
   (b) providing a current proportional to absolute temperature (Iptat) to the current path of the further transistor (Q3), to thereby produce a third base-emitter voltage (Vbe3);
   (c) converting Vbe1 and Vbe2 to currents using a voltage-to-current converter that includes a first resistor (R1), to thereby produce analog current signals indicative of the magnitudes of Vbe1 and Vbe2;
   (d) converting Vbe3 to a reference current (Iref) using a further voltage-to-current converter that includes a second resistor (R2), where Iref=Vbe3/R2;
   (e) digitizing analog current signals indicative of the magnitudes of Vbe1 and Vbe2, including using Iref as a reference when digitizing the analog current signals indicative of the magnitudes of Vbe1 and Vbe2;
   (f) digitally determining a difference between the magnitudes of Vbe1 and Vbe2; and (g) producing a digital temperature reading (DTR) using the following equation $$DTR = K*(R2/R1)*(kT/q)\ln(M)/[K*(R2/R1)*(kT/q)\ln(M)+Vbe3]*(2^N),$$

where K is a constant, k is Boltzmann's constant, T is the temperature in degrees Kelvin, q is the electron charge, and N is an integer $\geq 2$, and wherein the difference between the magnitudes of Vbe1 and Vbe2 determined at step (f) is used in the equation as the value for $(kT/q)\ln(M)$.

9. A method for producing a temperature reading using a transistor (Q1) including a base, an emitter and a collector, where the base is connected to the collector, and a current path is between the emitter and the collector, the method comprising:

(a) using one or more current sources and one or more switches to provide a first amount of current (I1) and a second amount of current (I2) to the current path of the transistor (Q1), during different time slots of a time period, to thereby produce a first base-emitter voltage (Vbe1) and a second base-emitter voltage (Vbe2), where I1=I2*M, and M is a known constant, wherein the one or more switches are turned on and off at times that corresponds to transitions of a clock signal;

(b) using a voltage-to-current converter to convert Vbe1 and Vbe2 to currents;

(c) turning off a further switch, at the output of the voltage-to-current converter, for short time periods centered about transitions of the clock signal, to reduce effects of charge-injection due to the turning on and off of the one or more switches used to provide I1 and I2 to the current path of the transistor (Q1);

(d) digitizing analog current signals indicative of magnitudes of Vbe1 and Vbe2;

(e) digitally determining a difference between the magnitudes of Vbe1 and Vbe2; and (f) producing a digital temperature reading (DTR) based on the difference between the magnitudes of Vbe1 and Vbe2.

10. A method for producing a temperature reading using a transistor (Q1) including a base, an emitter and a collector, where the base is connected to the collector, and a current path is between the emitter and the collector, the method comprising:

(a) providing a first amount of current (I1) and a second amount of current (I2) to the current path of the transistor (Q1), during different time slots of a time period, to thereby produce a first base-emitter voltage (Vbe1) and a second base-emitter voltage (Vbe2), where I1=I2*M, and M is a known constant;

(b) providing a current proportion to absolute temperature (Iptat) to the current path of the transistor (Q1) during one or more further time slots of the time period to thereby produce a third base-emitter voltage (Vbe3);

(c) digitizing analog signals indicative of magnitudes of Vbe1 and Vbe2;

(d) digitally determining a difference between the magnitudes of Vbe1 and Vbe2; and (e) producing a digital temperature reading (DTR) based on the difference between the magnitudes of Vbe1 and Vbe2, using the following equation $$DTR = K*(kT/q)\ln(M)/[K*(kT/q)\ln(M)+Vbe3]*(2^N),$$

where K is a constant, k is Boltzmann's constant, T is the temperature in degrees Kelvin, q is the electron charge, and N is an integer >2, and wherein the difference between the magnitudes of Vbe1 and Vbe2 determined at step (d) is used in the equation as the value for $(kT/q)\ln(M)$.

11. The method of claim 10, wherein the transistor (Q1) was produced using a bipolar junction transistor (BJT) process, a complementary-metal-oxide semiconductor (CMOS) process or a BJT/BiCMOS process.

12. A method for producing a temperature reading using a transistor (Q1) including a base, an emitter and a collector, with a resistor (R3) and a switch (S1) connected in parallel between the base and the collector, and the collector connected to ground, the method comprising:

(a) providing a first amount of current (I1) and a second amount of current (I2) to the current path of the transistor (Q1), during different time slots of a time period, to thereby produce a first base-emitter voltage (Vbe1) and a second base-emitter voltage (Vbe2), where I1=I2*M, and M is a known constant;

(b) digitizing analog signals indicative of magnitudes of Vbe1 and Vbe2;

(c) digitally determining a difference between the magnitudes of Vbe1 and Vbe2; and (d) producing a digital temperature reading (DTR) based on the difference between the magnitudes of Vbe1 and Vbe2;

wherein step (a) also includes
closing the switch (S1) while I1 is provided to the current path of the transistor (Q1); and
opening the switch (S1) while I2 is provided to the current path of the transistor (Q1).

13. The method of claim 4, wherein M is greater than or equal to 3.

14. The method of claim 12, wherein the resistor (R3) is used to compensate for a base resistance (rb) of the transistor (Q1).

15. The method of claim 1, wherein the constant K is selected to compensate for bandgap reference voltage curvature and to achieve an accuracy for the DTR of better than +/−0.3 deg. C.

16. A method for producing a temperature reading using
a transistor (Q1) including a base, an emitter and a collector, where the base is connected to the collector, and a current path is between the emitter and the collector, and
a further transistor (Q3) including a base, an emitter and a collector, where the base is connected to the collector, and a current path is between the emitter and the collector, the method comprising:

(a) providing a first amount of current (I1) and a second amount of current (I2) to the current path of the transistor (Q1), during different time slots of a time period, to thereby produce a first base-emitter voltage (Vbe1) and a second base-emitter voltage (Vbe2), where I1=I2*M, and M is a known constant;

(b) providing a current proportional to absolute temperature (Iptat) to the current path of the further transistor (Q3), to thereby produce a third base-emitter voltage (Vbe3);

(c) converting Vbe1 to Vbe2 to analog current signals indicative of the magnitudes of Vbe1 and Vbe2;

(d) converting Vbe3 to a reference current (Iref) indicative of the magnitude of Vbe3;

(e) digitizing analog current signals indicative of the magnitudes of Vbe1 and Vbe2, including using Iref as a reference when digitizing the analog current signals indicative of the magnitudes of Vbe1 and Vbe2; and (f) digitally determining a difference between the magnitudes of Vbe1 and Vbe2, and producing a digital temperature reading (DTR) using the difference between the magnitudes of Vbe1 and Vbe2, and using Vbe3.

17. The method of claim 16, wherein step (f) comprises producing the digital temperature reading (DTR) using the following equation $$DTR=K*(R2/R1)*(|Vbe1-Vbe2|)/[K*(R2/R1)*(|Vbe1-Vbe2|)+Vbe3]*(2^N),$$

where K is the constant and N is an integer $\geq 2$.

18. The method of claim 17, wherein N is the number of bits of resolution of an analog-to-digital converter (ADC) that is used to perform step (e).

19. The method of claim 17, wherein the constant K is selected to compensate for bandgap reference voltage curvature and to achieve an accuracy for the DTR of better than +/−0.3 deg. C.

20. The method of claim 17, wherein step (f) comprises producing the digital temperature reading (DTR) using the following equation $$DTR=(K*|Vbe1-Vbe2|)/[K*|Vbe1-Vbe2|+Vbe3]*(2^N),$$

where K is a constant and N is an integer $\geq 2$.

21. The method of claim 20, wherein N is the number of bits of resolution of an analog-to-digital converter (ADC) that is used to perform step (e).

22. The method of claim 20, where step (b) includes selecting the current proportional to absolute temperature (Iptat) to compensate for manufacturing process variations that affect the third base-emitter voltage (Vbe3).

23. The method of claim 22, wherein the constant K is selected to compensate for bandgap reference voltage curvature and to achieve an accuracy for the DTR of better than +/−0.3 deg. C.

* * * * *

UNITED STATES PATENT AND TRADEMARK OFFICE
CERTIFICATE OF CORRECTION

PATENT NO. : 7,686,508 B2 Page 1 of 1
APPLICATION NO. : 11/584421
DATED : March 30, 2010
INVENTOR(S) : Lin et al.

It is certified that error appears in the above-identified patent and that said Letters Patent is hereby corrected as shown below:

In claim 1, at column 9, line 44, replace "$\geqq$" with "$\geq$";

In claim 4, at column 9, line 66, after "slot" insert --,--; and

In claim 10, at column 11, line 66, replace ">" with "$\geq$".

Signed and Sealed this

Twenty-fifth Day of May, 2010

David J. Kappos
*Director of the United States Patent and Trademark Office*